(12) United States Patent
Parker et al.

(10) Patent No.: US 7,263,610 B2
(45) Date of Patent: Aug. 28, 2007

(54) SECURE MULTICAST FLOW

(75) Inventors: Alistair John Parker, Quispamsis (CA); Gino Louis Dion, Lakeside (CA); Sean Gordon Higgins, Saint John (CA)

(73) Assignee: ImagicTV, Inc., St. John (CA)

( * ) Notice: Subject to any disclaimer, the term of this patent is extended or adjusted under 35 U.S.C. 154(b) by 936 days.

(21) Appl. No.: 10/208,562

(22) Filed: Jul. 30, 2002

(65) Prior Publication Data

US 2004/0025013 A1   Feb. 5, 2004

(51) Int. Cl.
*H04L 9/00* (2006.01)
*H04L 9/32* (2006.01)

(52) U.S. Cl. .................... 713/163; 713/151; 726/27
(58) Field of Classification Search ............... 713/151, 713/154, 163; 726/27
See application file for complete search history.

(56) References Cited

U.S. PATENT DOCUMENTS

| | | | |
|---|---|---|---|
| 6,101,180 A * | 8/2000 | Donahue et al. ............ 370/352 |
| 6,233,618 B1 * | 5/2001 | Shannon .................... 709/229 |
| 6,279,112 B1 | 8/2001 | O'Toole, Jr. et al. | |
| 6,331,983 B1 * | 12/2001 | Haggerty et al. ........... 370/400 |
| 6,385,647 B1 | 5/2002 | Willis et al. | |
| 6,912,528 B2 * | 6/2005 | Homer ........................ 707/9 |
| 2001/0023487 A1 | 9/2001 | Kawamoto | |
| 2002/0042883 A1 | 4/2002 | Roux et al. | |
| 2002/0048275 A1 | 4/2002 | Atwater et al. | |

FOREIGN PATENT DOCUMENTS

WO   WO 00/74381 A1   12/2000

OTHER PUBLICATIONS

Abstract for Japanese Patent No. JP 2003 158547, May 30, 2003.

* cited by examiner

*Primary Examiner*—Gilberto Barron, Jr.
*Assistant Examiner*—Thomas Szymanski
(74) *Attorney, Agent, or Firm*—Workman Nydegger

(57) ABSTRACT

Methods, devices and systems for providing content providers with a secure way to multicast their data flows only to legitimate end users. By making a specific decision for each potentially legitimate end user requesting a specific data flow, differing subscriber profiles may be taken into account. Furthermore, end to end encryption is avoided by having a switch and/or router control the specific data flow to a specific end user. Each end user sends a request DTU to the switch and/or router asking for permission to join a multicast group. The switch and/or router extracts identification data from the request data transmission unit (DTU) and determines whether the requesting end user is cleared for the requested specific data flow. This determination may be made by sending a query DTU containing the identification data to a policy server which checks the identification data against preprogrammed criteria in its databases. The policy server then sends a response DTU to the switch and/or router confirming or denying the authenticity or legitimacy of the request based on the identification data. In the meantime, after the switch and/or router sends the query DTU to the policy server, the switch and/or router allows the specific requested data flow to proceed to the requesting end user. If, based on the response from the policy server, the request is determined to not be legitimate or authentic, the specific data flow is terminated. If the request is legitimate or authentic, then the data flow is allowed to flow uninterrupted by the switch and/or router.

30 Claims, 3 Drawing Sheets

SECURE MULTICAST FLOW

FIELD OF THE INVENTION

The present invention relates to networking technologies and, more specifically, to technologies for providing a secure multicast flow between a multicast source and an end user receiving the multicast. The present invention is particularly applicable but is not limited to methods and devices for providing authentication and verification services to multicast providers.

BACKGROUND TO THE INVENTION

The increasing spread of computer technology and its application to all aspects of daily life has led to new and complex issues and problems. With the advent of broadband access to the Internet, an increasing number of content providers are using multicast technologies to deliver their content to subscribers. This usually involves establishing a continuous data flow between the content source and an end user device with the data flow containing the content. More often that not, such content takes the form of multimedia data with both voice and video content encoded in the data flow.

To simplify matters for end users, these data flows can be accessed by end user devices such as set top boxes. This technology has been used to deliver not only varied multimedia content but even regular television signals. Such TV signals are quite amenable to multicast technology as such signals are essentially broadcast to multiple end user devices simultaneously. All an end user device has to do to receive a TV signal multicast over the Internet is to receive the data flow emanating from the content source.

However, to prevent unauthorized access to these multicasts, content providers currently encrypt the multicast data at the source end. Legitimate end users can receive the data flow and are provided with appropriate decryption keys to decrypt the data flow. Such end-to-end encryption unfortunately can be inconvenient. Specifically, encryption and decryption capabilities are required at each end of the data flow link. Furthermore, the encryption and decryption keys and algorithms need to be periodically replaced or updated to prevent unauthorized users elements from breaking into the system. Clearly, such a system for preventing access to multicast data is inconvenient and can be costly. It is an object of the present invention to provide alternatives which overcomes or mitigates the disadvantages of the prior art.

It should be noted that the term data transmission unit (DTU) will be used in a generic sense throughout this document to mean units through which digital data is transmitted from one point in a network to another. Thus, such units may take the form of packets, cells, frames, or any other unit as long as digital data is encapsulated within the unit. Thus, the term DTU is applicable to any and all packets, cells, frames, or any other units that implement specific protocols, standards or transmission schemes. It should also be noted that the term digital data will be used throughout this document to encompass all manner of voice, multimedia content, video, binary data or any other form of data or information that has been digitized and that is transmitted from one point in a network to another.

SUMMARY OF THE INVENTION

The present invention provides methods, devices and systems for providing content providers with a secure way to multicast their data flows only to legitimate end users. By making a specific decision for each potentially legitimate end user requesting a specific data flow, differing subscriber profiles may be taken into account. Furthermore, end to end encryption is avoided by having a switch and/or router control the specific data flow to a specific end user. Each end user sends a request DTU to the switch and/or router asking for permission to join a multicast group. The switch and/or router extracts identification data from the request data transmission unit (DTU) and determines whether the requesting end user is cleared for the requested specific data flow. This determination may be made by sending a query DTU containing the identification data to a policy server which checks the identification data against preprogrammed criteria in its databases. The policy server then sends a response DTU to the switch and/or router confirming or denying the authenticity or legitimacy of the request based on the identification data. In the meantime, after the switch and/or router sends the query DTU to the policy server, the switch and/or router allows the specific requested data flow to proceed to the requesting end user. If, based on the response from the policy server, the request is determined to not be legitimate or authentic, the specific data flow is terminated. If the request is legitimate or authentic, then the data flow is allowed to flow uninterrupted by the switch and/or router.

In a first aspect the present invention provides a method for authenticating a request for a specific data flow from an end-user device, the method comprising:

a) receiving a request data transmission unit (DTU) from the end user device, said request DTU requesting said specific data flow for said end user device;

b) extracting identification data from said DTU, said identification data identifying said end user device and said specific data flow;

c) determining if said request DTU is legitimate based at least a portion of said identification data; and d) executing a predetermined set of steps based on whether said request DTU is legitimate as determined in step c).

In a second aspect the present invention provides a network device for routing multiple data flows from data servers to end user devices, the device comprising:

means for receiving a request data transmission unit (DTU) from an end user device, said request DTU requesting a specific data flow for said end user device;

means for extracting identification data from said request DTU, said identification data identifying said end user device and said specific data flow;

means for transmitting a query regarding an authentication of said request DTU to a policy server capable of authenticating said request DTU based on at least a portion of said identification data, said query containing said at least a portion of said identification data;

means for receiving a response from said policy server, said response being related to said query; and means for routing said specific data flow to said end user device, wherein said network device allows or prevents access to said specific data flow by said end user device based on whether said request DTU is legitimate.

In a third aspect the present invention provides computer readable media having encoded thereon a computer software product comprising:

a software module for receiving a request data transmission unit (DTU) from an end user device, said request DTU requesting a specific data flow for said end user device;

a software module for extracting identification data from said request DTU, said identification data identifying said end user device and said specific data flow;

a software module for determining if said request DTU is legitimate based on at least a portion of said identification data; and a software module for allowing a transmission of said specific data flow to said end user device.

In a fourth aspect the present invention provides a method of authenticating an end user device capable of coupling to a network, the method comprising:

a) receiving a data transmission unit (DTU) from said end user device, said DTU containing identification data identifying said end user device and specific data to which said end user device is supposed to have access;

b) extracting said identification data from said DTU; and c) determining if said end user device is entitled to access said specific data based on at least a portion of said identification data and a set of predetermined business rules.

BRIEF DESCRIPTION OF THE DRAWINGS

A better understanding of the invention will be obtained by considering the detailed description below, with reference to the following drawings in which.

DETAILED DESCRIPTION

Figure 1:
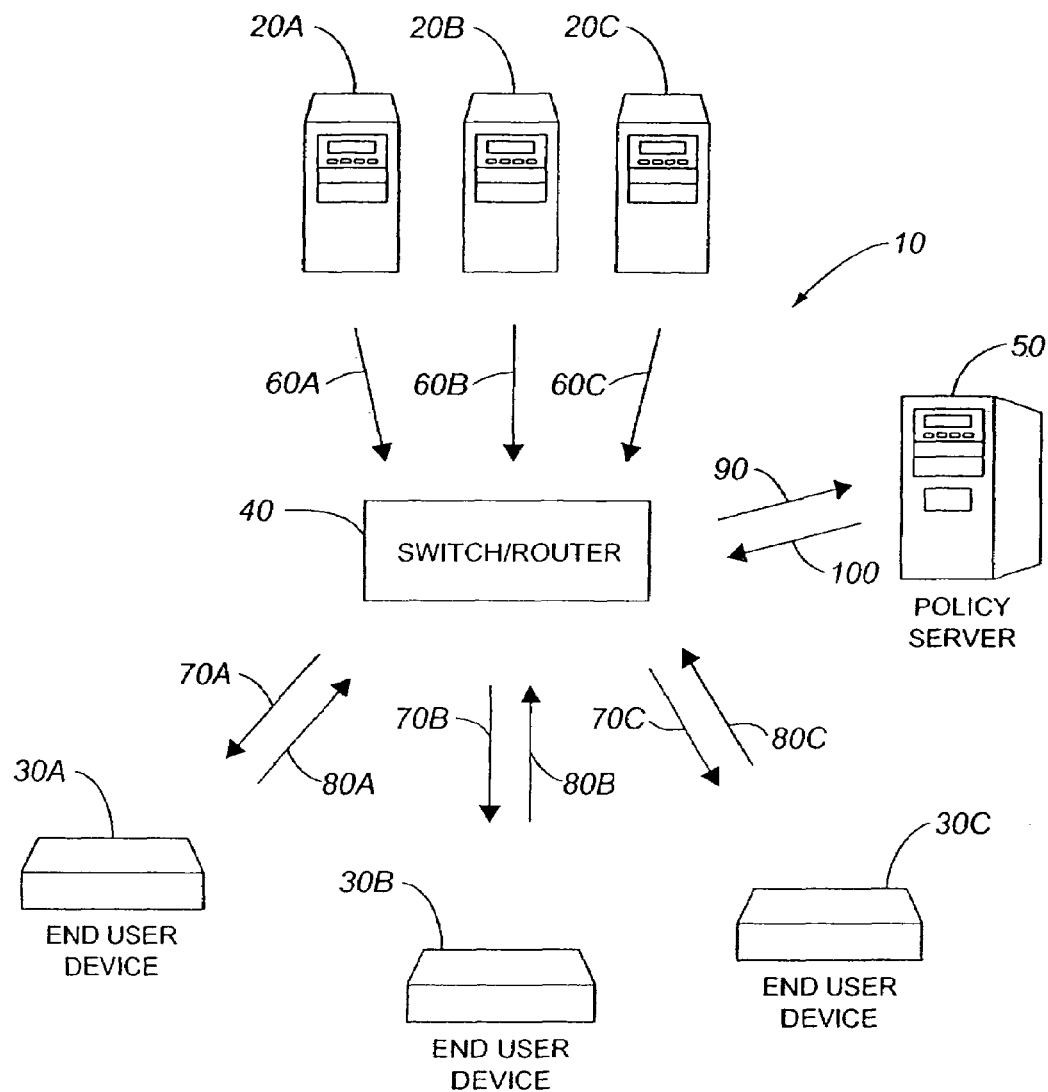
FIG. 1 is a block diagram of a system for providing secure multicast flow.

Referring to FIG. 1, a block diagram of a system for providing secure multicast flow is illustrated. The system 10 has multicast content servers 20A, 20B, 20C along with end user devices 30A, 30B, 30C. A switch and/or router 40 is also present along with a policy server 50. The content servers 20A, 20B, 20C transmit multicast data flows 60A, 60B, 60C to the switch and/or router 40 for distribution to end user devices 30A, 30B, 30C. The switch and/or router 40 also communicates with policy server 50.

The system 10 works with the content servers transmitting data flows 60A, 60B, 60C to the switch and/or router 40. Each data flow may be directed or routed to any number of end user devices of which end user devices 30A, 30B, 30C are representative. It is for this reason that the data flows 60A, 60B, 60C are referred to as multicast—each data flow may be broadcast to any number of recipient end user devices. However, only legitimate or authentic end user devices, those which subscribe to specific services provided by the operators of the content servers 20A, 20B, 20C are allowed access to the data flows. As an example, end user device 30A may subscribe to the data flows 60A and 60C but not to data flow 60B. Similarly, end user device 30B may be a legitimate subscriber to data flow 60B and 60C while end user device 30C may be a subscriber to all the data flows 60A, 60B, 60C.

To access the data flows to which they are subscribed, each end user device 30A, 30B, 30C independently sends a request to the switch and/or router 40 requesting a specific data flow. For our example, end user device 30A may request data flow 60 B while both end user devices 30B and 30C may both request data flow 60A. When the switch and/or router 40 receives the request, usually in the form of a request data transmission unit (DTU) that contains not only the identity of the requesting end user device but also the requested data flow, the switch and/or router 40 extracts this identification data from the request DTU. A determination must then be made whether the requesting end user device is allowed access to the specific requested data flow. For this determination, the switch and/or router 40 formulates a query DTU to be sent to the policy server 50 for each requested data flow. The query DTU is then forwarded to the policy server 50.

While the switch and/or router 40 is waiting for a response DTU from the policy server 50 containing a response to the query DTU, the switch and/or router 40 will allow the requested data flow to proceed to the requesting end user device. Thus, in FIG. 1 and returning to our example, end user devices 30A, 30B, 30C each sends a request DTU (represented by arrow 70A, 70B, 70C respectively) to the switch and/or router 40. Switch and/or router 40 then allows the requested data flows (represented by arrows 80A, 80B, 80C) to the requesting end user devices as the switch and/or router 40 communicates (arrow 90) with the policy server 50 by way of at least one query DTU. The switch and/or router 40 then receives at least one response DTU (arrow 100) from the policy server 50.

Once the switch and/or router 40 receives the relevant response DTU from the policy server 50, the switch and/or router 40 will then either terminate the data flow to the end user device associated with the response DTU received or let the data flow continue uninterrupted. As noted above in our example and referring to FIG. 1, end user device 30C is a subscriber to all three data flows 60A, 60B, 60C so its requested data flow 60A is allowed to continue uninterrupted. However, end user device 30B is not a subscriber to its requested data flow 60A and end user device 30A is not a subscriber to its requested data flow 60B. As such, both of these data flows (data flows 80A, 80B) are terminated by switch and/or router 40.

It should be noted that the policy server 50, once it receives a query DTU from the switch and/or router 40, can apply whatever preprogrammed security checks are required to authenticate the correlation between the requesting end user device and the requested specific data flow. For example, the policy server may check with an internal subscriber table to determine if the requesting end user device is a subscriber to the requested data flow. Similarly, the policy server 50 may also check its databases to determine if the requesting end user device is implementing minimum required security measures to receive the requested data flow. As another alterative, the policy server 50 may check with accounting records to determine if the end user using the requesting end user device is current with his or her accounts. If the account is delinquent, the policy server 50 may then return a reject for the requested data flow. Another option is for the policy server to implement predetermined and preprogrammed business rules in conjunction with the identification data extracted from the request DTU to determine whether a requested data flow is to be allowed. Many other criteria may be implemented by the policy server to determine whether a specific request by a specific end user device for a specific data flow is to be allowed or not. The legitimacy or whether the request DTU is legitimate is therefore dependent on the policies implemented by the policy server. To assist in the tracking of the response DTUs from the policy server, each response DTU may have the identification data that was originally contained in the query DTU to which the response DTU is responding. The switch and/or router 40 then merely has to cross-reference its record of query DTU sent with the received response DTUs to determine which data flows are to be left uninterrupted and which ones are to be terminated.

As an option, and to reduce the amount of traffic between the policy server and the switch and/or router, the switch and/or router 40 could be provided with a default position and the policy server need only send a response when the default position is no longer operable. For example, the default position could be for the switch and/or router to allow the requested data flow to go through. If the query DTU sent to the policy server results in an authentication/legitimization of the requesting end user device, the policy server does not have to send a response DTU to the switch and/or router. In the absence of a request DTU from the policy server, the switch and/or router will let the allowed requested data flow to continue. However, if the policy server sends a response DTU in response to a query DTU, then the previously allowed data flow is to be interrupted. It should be clear that this alternative scheme, if implemented, must have a timer which determines how long the switch and/or router will wait for a response DTU.

Another alternative to the above would be to, instead of allowing a requested data flow to proceed, the requested data flow is prevented from continuing unless a positive response DTU is received in a given amount of time. For this alternative, the switch and/or router waits for a positive response DTU from the policy server before allowing the requested data flow to proceed. Again, this scheme will require a timer which will determine how long the switch and/or router will wait for a response DTU from the policy server.

A further alternative would be for the policy server to log query DTUs it has received while the switch and/or router allows the requested data flows to continue. The logged query DTUs will then be analysed at a later time by the policy server and if any of these logged query DTUs fail the check and analysis, its corresponding data flow is then terminated.

For specific implementations of the above, it is preferred that the request DTU sent by the end user devices to the switch and/or router 40 be an IGMP (Internet Group Management Protocol) join message. IGMP (details of which may be found in Internet Engineering Task Force (IETF) RFC 2236 and RFC 1112) is an Internet protocol which provides a way for an Internet computer to report its multicast group membership to adjacent routers. Thus, an IGMP join message from end user device 30A merely requests that end user device 30A be added to the multicast group membership for a specific multicast data flow.

The use of the IGMP protocol may also simplify the extraction of the identification data from the request DTU. Because each MAC (Media Access Control) identification number is unique for every network access device (e.g. network cards), this MAC number can be used as one of the identification data to extracted. This MAC address is a hardware unique to each piece of equipment, and specifically identifies each hardware device. Another possible component of the identification data to be extracted can be the unique IP (Internet Protocol) or network address of the requesting end user device. Both the MAC address and the IP address can be extracted from the IGMP join message as all IGMP messages have the following format:

| MAC Header | IP Header | IGMP Payload |
|---|---|---|

The IGMP payload would contain data identifying the requested data flow. This can include the identity or address of the source of the requested data flow. Thus, returning to the example above, the end user device 30A, when requesting data flow 60B, may not only refer specifically to data flow 60B, but also to content server 20B that is the origin of data flow 60B.

It should further be noted that the functions of the switch and/router 40 need not be executed by a switch or a router. Any IGMP routing contact point can execute these functions. Thus, a generic device that can receive the request DTU and can pass a query DTU to a policy server and, consequently, direct or affect the data flow to the end user device, can be used.

The above system is particularly applicable to applications where the end user devices are set top boxes (STB). Such applications, where the STBs can automatically send the request DTUs to the switch and/or router 40, are usually found in systems where the data flows have multimedia content such as television channel feeds from specific TV stations with the data flows being distributed to the subscribing end users by way of a broadband link to the Internet.

To prevent denial of service (DoS) attacks from hackers or illegitimate end users, the switch and/or router 40 may be provided with the capability to cache or store previous response DTUs from the policy server. With such a capability, repeated requests from an illegitimate end user device will not result in repeated query DTUs to the policy server.

As another alternative, the functions of the policy server 50 may be integrated into the switch and/or router 40. Such an integrated device can not only perform the routing of the data flows but also the function of determining whether the request DTUs are legitimate or not. The integrated device would therefore have the wherewithal to perform security checks and account checks for the multiple of end user devices.

If, on the other hand, a separate policy server is desired, a server implementing any of the following protocols/standards may be used:

RADIUS (Remote Authentication Dial-In User Service)
  (See IETF RFC 2138 and 2139 for details)
LDAP (Light Weight Directory Access Protocol)
SNMP (Simple Network Management Protocol)

Figure 2:
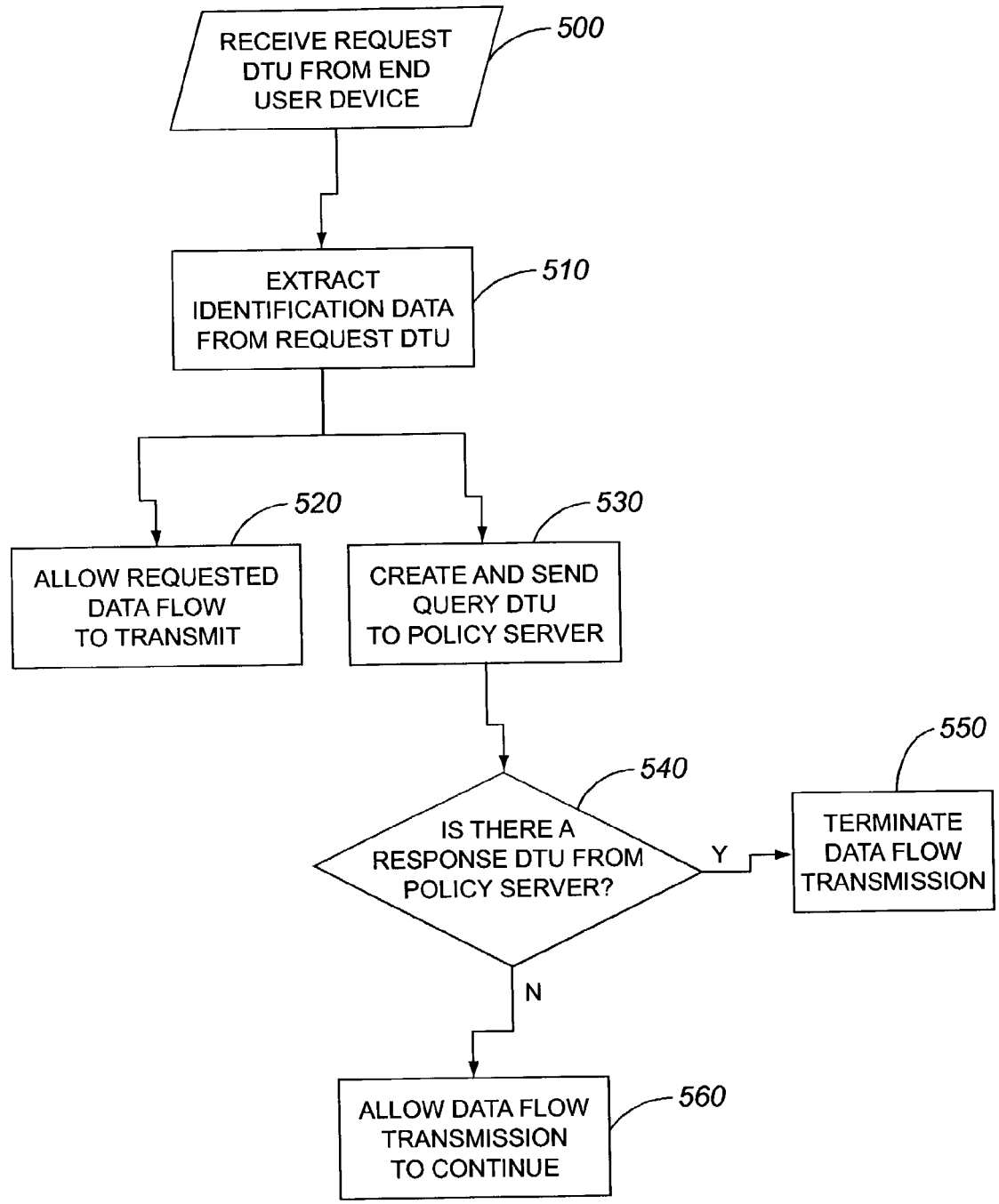
FIG. 2 is a flow chart illustrating the steps taken by a switch and/or router in providing secure multicast flow.

As a process, the system above, can be implemented as shown in FIG. 2, a flowchart illustrating the steps taken by a switch and/or router 40 in providing secure multicast flow. As can be seen in the figure, the process begins with step 500—receiving a request DTU from an end user device. Step 510 is that of extracting the identification data from the request DTU. This request data includes not only the data identifying the requesting end user device (such as its MAC address and IP address) but also data identifying the requested data flow. Steps 520 and 530 are performed either concurrently or in succession. Step 520 is that of allowing the requested data flow to reach the requesting end user device. In step 530, the switch and/or router 40 creates a query DTU containing the identification data extracted in step 510. Also in step 530, the switch and/or router 40 sends the query DTU to a policy server for authentication/validation of the request from the end user device. Step 540 is a check whether a response DTU has been received from the policy server. Since, for this implementation, the default position is to allow the data flow transmission to continue absent any response from the policy server, all that is required is to determine whether a response DTU corresponding to the query DTU, sent in step 530, has been received. If a corresponding response DTU has been received, then (step 550) the data flow transmission must be terminated as the response DTU means that the request DTU has not been authenticated/legitimized. On the other hand, if a response DTU has not been received by the switch and/or router, the data flow transmission is allowed to continue uninterrupted (step 560).

It should be noted that the above process has many variants which are still covered by the concepts disclosed above. As noted earlier, the default position may be either to allow the transmission or to prevent the transmission absent any response from the policy server. However, it has been found that, for Internet TV based applications, allowing access to the data flow absent any negative response DTUs is preferable.

The process above may be adjusted for applications involving periodic authentication checks by the end user devices. For such application, the end user devices receiving their data flows would periodically transmit a DTU containing their identification data to the switch and/or router. The switch and/or router will then authenticate the end user device. If the authentication fails for whatever reason, the data flow to the end user device is terminated, regardless of whether the end user device was previously allowed access to the data flow or not. Such a scheme will allow for changing conditions in the databases of the policy server to be taken into account. As an example, if a business rule in the policy server commands that any subscriber who is more than 60 days overdue in his payments is to be cut off, up to the $59^{th}$ day that subscriber will be allowed access. On the $60^{th}$ day, however, conditions will have changed and the subscriber is no longer allowed access. As such, on the $60^{th}$ day, any data flow to that subscriber is to be terminated by the switch and/or router.

The system/method outlined above may be used not only in set top box applications but also in satellite based delivery of digital cable signals. Also, other applications which require authentication, either one time or periodical authentication, of end user devices may use the above system. Thus, satellite, cable, wireless, or any other means for delivering digital media services (such as digital television or digital radio) are particularly adaptable to the above system.

Figure 3:
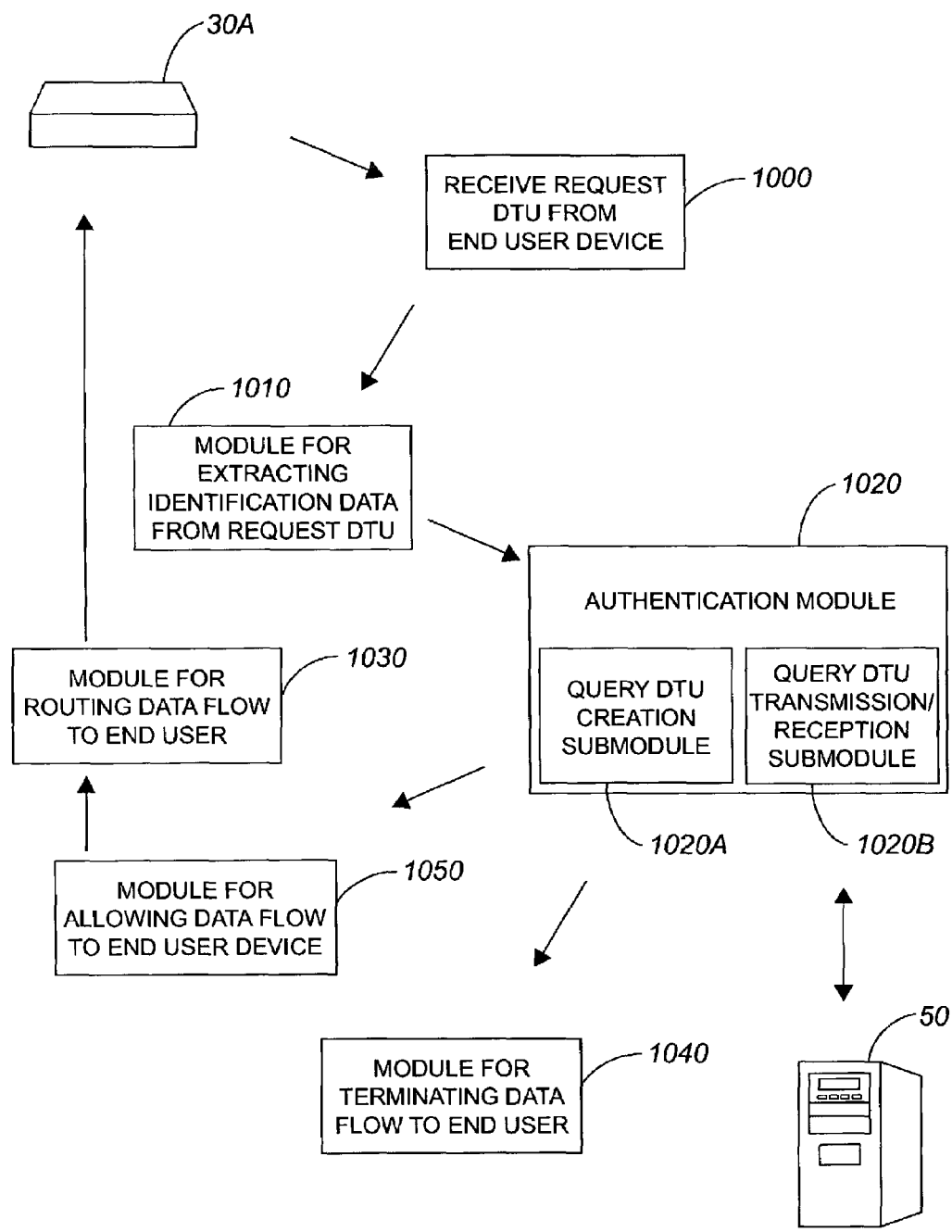
FIG. 3 is a block diagram of software modules and submodules which may be used to implement aspects of the invention.

As a software product, the above can be implemented with different modules executing different functions (see FIG. 3). As an example, each of the following functions can be implemented by different modules:

receiving a request DTU from the end user device (module 1000);

extracting the identification data from the request DTU (module 1010):

determining the authenticity of the request DTU by creating and sending a query DTU to the policy server and receiving the response DTU from the policy server (module 1020 and submodules 1020A and 1020B);

routing the requested data flow to the requesting end user device (module 1030); and terminating the data flow to the end user device (module 1040)

allowing the data flow to the end user device (module 1050).

These modules communicate with each other to pass data and DTUs between them so that each module may execute its function. It should be noted that modules 1040 and 1050 are merely two options to the same end result—disallowing access to the data flow to unauthorized end user devices.

As can be seen, the end user device 30A sends a request DTU to the module 1000. The module 1000 then sends the request DTU to module 1010 so the identification data can be extracted. The extracted identification data can then be sent to module 1020 where submodule 1020A creates a request DTU and submodule 1020B sends the request DTU to the policy server 50. Depending on the implementation and on the results of the authentication check on the policy server, the policy server 50 may or may not send a response DTU. Based on whether a response DTU is received or not or based on the contents of a received response DTU, module 1020 sends a command to module 1040 or to module 1050 (depending on the implementation). If module 1050 is used in the implementation, a message is sent to module 1030 which routes the data flow to the end user device 30A. On the other hand, if the default action is to allow the data flow to proceed and module 1040 is used in the implementation instead of module 1050, module 1030 has already routed the data flow to the end user device 30A. A message can then come from module 1020 instructing module 1040 to terminate the data flow. This message would cause module 1030 to stop the data flow to end user device 30A.

Embodiments of the invention may be implemented in any conventional computer programming language. For example, preferred embodiments may be implemented in a procedural programming language (e.g. "C") or an object oriented language (e.g. "C++"). Alternative embodiments of the invention may be implemented as pre-programmed hardware elements, other related components, or as a combination of hardware and software components.

Embodiments can be implemented as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or electrical communications lines) or a medium implemented with wireless techniques (e.g., microwave, infrared or other transmission techniques). The series of computer instructions embodies all or part of the functionality previously described herein. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server over the network (e.g., the Internet or World Wide Web). Of course, some embodiments of the invention may be implemented as a combination of both software (e.g., a computer program product) and hardware. Still other embodiments of the invention may be implemented as entirely hardware, or entirely software (e.g., a computer program product).

Although various exemplary embodiments of the invention have been disclosed, it should be apparent to those skilled in the art that various changes and modifications can be made which will achieve some of the advantages of the invention without departing from the true scope of the invention.

A person understanding this invention may now conceive of alternative structures and embodiments or variations of the above all of which are intended to fall within the scope of the invention as defined in the claims that follow.

What is claimed is:

1. A method for authenticating a request for a specific data flow from an end-user device, the method comprising:
    a) receiving a request data transmission unit (DTU) from the end user device, said request DTU requesting said specific data flow for said end user device;
    b) extracting identification data from said DTU, said identification data identifying said end user device and said specific data flow;
    c) allowing a data transmission of said specific data flow to said end user device;
    d) determining if said request DTU is legitimate based on at least a portion of said identification data; and
    e) terminating said data transmission allowed in step c) in the event said request DTU is not legitimate.

2. A method according to claim 1 wherein step d) includes transmitting said identification data to a policy server for authentication of said request DTU.

3. A method according to claim 2 wherein step d) includes receiving a response from said policy server, said response containing an indication of a legitimacy of said request DTU.

4. A method according to claim 2 wherein step d) includes determining that said request DTU is legitimate based on whether a response is received from said policy server.

5. A method according to claim 2 wherein said policy server uses predetermined business rules in conjunction with at least a portion of said identification data to determine if said request DTU is to be authenticated.

6. A method according to claim 1 wherein said method is executed by a device selected from a group comprising:
    a network switch; and
    a network router.

7. A method according to claim 1 wherein said identification data includes data selected from a group comprising:
    a network address of the end user device; and
    a hardware specific address of the end user device.

8. A method according to claim 1 wherein said identification data includes data identifying a source of said specific data flow.

9. A method according to claim 1 wherein said request DTU is an IGIMP (Internet Group Management Protocol) message requesting permission to join a specific multicast group said specific multicast group receiving said specific data flow.

10. A method according to claim 1 wherein said specific data flow is a multicast stream.

11. A method according to claim 10 wherein said multicast stream has encoded thereon multimedia content.

12. A method according to claim 2 further including the step of caching previous responses from said policy server.

13. A network device for routing multiple data flows from data servers to end user devices, the device comprising:
    means for receiving a request data transmission unit (DTU) from an end user device, said request DTU requesting a specific data flow for said end user device;
    means for extracting identification data from said request DTU, said identification data identifying said end user device and said specific data flow
    means for transmitting a query regarding an authentication of said request DTU to a policy server capable of authenticating said request DTU based on at least a portion of said identification data, said query containing said at least a portion of said identification data;
    means for receiving a response from said policy server, said response being related to said query; and
    means for routing said specific data flow to said end user device if said network device receives a response from said policy server indicating that said request DTU is legitimate; and
    means for terminating said specific data flow to said end user device after said specific data flow has been routed to said end user device if said network device receives a response from said policy server indicating that said request DTU is not legitimate,
    wherein said network device initially provides access to said specific data flow prior to a determination of whether said request DTU is legitimate.

14. A network device according to claim 13 wherein said identification data includes data selected from a group comprising:
    IP address of the end user device;
    MAC address of the end user device.

15. A network device according to claim 13 wherein said identification data includes data identifying a data server which is a source of said specific data flow.

16. A network device according to claim 13 wherein said request DTU is an IGMP (internet Group Management Protocol) message requesting permission to join a specific multicast group said specific multicast group receiving said specific data flow.

17. A network device according to claim 13 further including caching means for cashing previous responses from said policy server.

18. Computer readable media having encoded thereon a computer software product comprising:
    a software module for receiving a request data transmission unit (DTU) from an end user device, said request DTU requesting a specific data flow for said end user device;
    a software module for extracting identification data from said request DTU, said identification data identifying said end user device and said specific data flow;
    a software module for determining if said request DTU is legitimate based on at least a portion of said identification data; and
    a software module for allowing a transmission of said specific data flow to said end user device prior to a determination of whether said request DTU is legitimate.

19. Computer readable media according to claim 18 wherein said product includes a software module chosen from a group comprising:
    a software module for terminating said transmission of said specific data flow in the event said request DTU is not legitimate; and
    a software module for preventing said transmission of said specific data flow in the event said request DTU has previously been determined to not be legitimate.

20. Computer readable media according to claim 18 wherein said software module for determining if said request DTU is legitimate includes:

a software submodule for transmitting said identification data to a policy server for authentication of said request DTU based on said identification data; and a software submodule for receiving a response from said policy server, said response containing an indication of an authenticity of said request DTU.

21. Computer readable media according to claim 18 wherein said identification data includes data selected from a group comprising:

a network address of the end user device; and a hardware specific address of the end user device.

22. Computer readable media according to claim 18 wherein said data includes data identifying a source of said specific data flow.

23. Computer readable media according to claim 21 wherein said network address is an IP address.

24. Computer readable media according to claim 21 wherein said hardware specific address is a MAC address.

25. A method according to claim 7 wherein said network address is an IP address.

26. A method according to claim 7 wherein said hardware specific address is a MAC address.

27. A method of authenticating an end user device capable of coupling to a network, the method comprising:

a) receiving a data transmission unit (DTU) from said end user device, said DTU containing identification data identifying said end user device and specific data to which said end user device is supposed to have access;

b) extracting said identification data from said DTU;

c) determining if said end user device is entitled to access said specific data based on at least a portion of said identification data and a set of predetermined business rules; and d) terminating previously allowed access to said specific data by said end user device in the event said end user device is not entitled to have access to said specific data.

28. A method according to claim 27 wherein step c) further includes transmitting said identification data to a policy server, said policy server having means for authenticating said end user device using said identification data and said set of business rules.

29. A method according to claim 28 wherein said step c) further includes receiving a response from said policy server, said response containing an indication of an authenticity of said end user device.

30. A method according to claim 28 wherein step c) includes determining if said end user device is authentic based on whether a response is received from said policy server.

* * * * *

UNITED STATES PATENT AND TRADEMARK OFFICE
CERTIFICATE OF CORRECTION

Page 1 of 2

PATENT NO.       : 7,263,610 B2
APPLICATION NO.  : 10/208562
DATED            : August 28, 2007
INVENTOR(S)      : Parker et al.

It is certified that error appears in the above-identified patent and that said Letters Patent is hereby corrected as shown below:

Drawings
Sheet 1, replace FIG. 1 with the figure depicted herein below, wherein the arrows associated with the "request DTUs" 70A, 70B, and 70C and wherein the "requested data flows" 80A, 80B, and 80C have been changed to show the correct direction of data flow

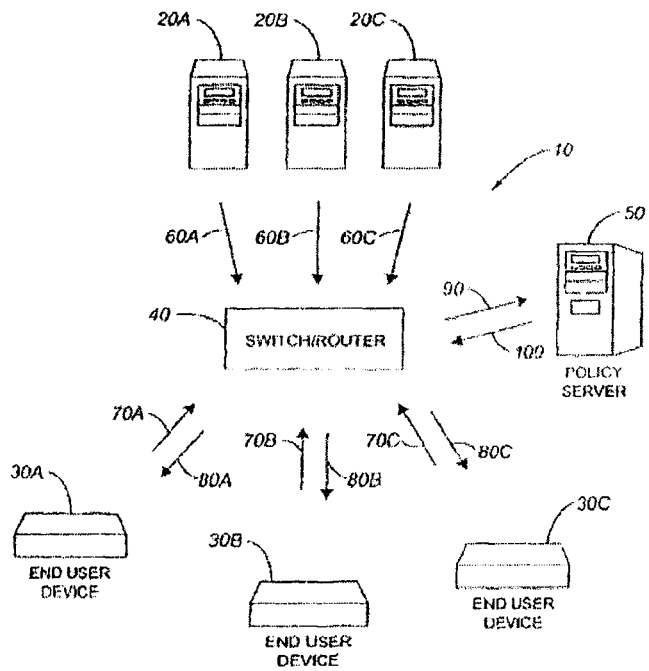

FIG. 1
(Prior Art)

Column 1
Line 48, change "overcomes or mitigates" to --overcome or mitigate--

Signed and Sealed this
Thirty-first Day of May, 2011

David J. Kappos
*Director of the United States Patent and Trademark Office*

CERTIFICATE OF CORRECTION (continued)

U.S. Pat. No. 7,263,610 B2

Column 2
Line 36, after "based" insert --on--

Column 9
Line 53, change "IGIMP" to --IGMP--

Column 10
Line 38, change "cashing" to --caching--